United States Patent [19]

Jackson et al.

[11] Patent Number: 4,805,875

[45] Date of Patent: Feb. 21, 1989

[54] JACK ASSEMBLY FOR RAILROAD CARS

[75] Inventors: Kenneth J. Jackson, St. John, Ind.; Jagdish Shah, Lombard, Ill.; Robert E. Graham, Jr., Omaha, Nebr.

[73] Assignee: Trailer Train Company, Chicago, Ill.

[21] Appl. No.: 2,936

[22] Filed: Jan. 13, 1987

[51] Int. Cl.[4] .................... B60P 1/00

[52] U.S. Cl. .................... 254/2 R; 254/90; 254/89 R; 254/93 R

[58] Field of Search .................... 254/2 R, 2 C, 2 B, 8 R, 254/8 C, 8 B, 9 R, 9 C, 124, 90, 35, 133, 93 H, 93 R, 89 H; 269/228

[56] References Cited

U.S. PATENT DOCUMENTS

| | | | |
|---|---|---|---|
| 2,353,381 | 7/1944 | Allerige | 254/90 |
| 2,369,838 | 2/1945 | Minnis | 254/2 C |
| 3,829,063 | 8/1974 | Holyworth | 254/2 R |
| 3,843,092 | 10/1974 | Oehler | 254/2 R |
| 4,226,401 | 10/1980 | Coulombe | 254/2 B |

*Primary Examiner*—Frederick R. Schmidt
*Assistant Examiner*—Judy J. Hartman
*Attorney, Agent, or Firm*—Kinzer, Plyer, Dorn, McEachran & Jambor

[57] ABSTRACT

The disclosed jack assembly has an elongated structural beam of sufficient length to extend between and beyond the two rails of a railroad track to be supported on top of the rails. A compact power lift cylinder, in the form of a multiple-sleeve power cylinder, is connected to the beam; and a car engaging plate is coupled to the power lift cylinder, to be moved in a direction transverse to the beam. The silhouette of the beam, power lift cylinder and plate is low, when the power lift cylinder is contracted, to allow them to be fitted with clearance to a lifting position, under a railroad car with the beam extended across the track rails and the car engaging plate vertically aligned under the railroad car frame. The power lift cylinder has a power stroke sufficient to lift the overlying railroad car enough above the rails to remove the railroad car completely from one wheeled truck assembly, for replacement or the like. Blocks carried on the beam can be shifted against the raised car engaging plate, to hold it independently of failure of the power lift. A pumping system for the power lift is located laterally beyond the one side of the road car, with operating controls within easy reach of someone standing at this location. The pumping system can optionally be secured as a unitary part of the jack assembly, or as a separate unit. The jack assembly can be used from either side of the car, typically at a location between the wheeled truck assemblies supporting the car.

27 Claims, 5 Drawing Sheets

JACK ASSEMBLY FOR RAILROAD CARS

BACKGROUND OF THE INVENTION

A typical railroad car has an elongated frame; and a wheeled truck assembly is at each end of the car, connected to the frame to rotate about a substantially vertical axis. Each wheeled truck assembly has flanged wheels, that are adapted to roll on a pair of track rails. With the wheels on the rails, there may be clearance of perhaps only approximately 10 inches between the tops of the rails and the underside of the railroad car frame.

Routine maintenance may require that the car frame be elevated somewhat to increase this clearance. One specific form of maintenance may require that the railroad car be completely removed from one wheeled truck assembly, to allow such truck assembly to be replaced with another. To do this, the one end of the car may be lifted vertically perhaps 10-25 inches, while the other end of the car remains supported on the other wheeled truck assembly. With the one car end so elevated, both the old and the new truck assemblies can be rolled on the rails, respectively from and to being under the car. Other forms of maintenance may require someone to crawl about under the car, where this increased clearance would also be benefical.

One way of lifting one end of the railroad car is by means of a crane, by connecting its lift line to the car frame, such as at the car coupling. This of course requires the presence of a high capacity crane, that can carry the load of the car; which crane typically will be quite large and represent a significant capital investment. Moreover, such a crane may be mounted on a special railroad service car or road vehicle, so that it is not portable. Also, if limited to roll along on track rails, the crane may not be very convenient to move from one site need to another; or if on a road vehicle and/or because of its size, the crane may be used at only certain rail sites.

Another way the railroad car can be removed from the wheeled truck assembly is by means of a pair of separate lift jacks, interposed between the underlying rail bed and each side of the car frame. These jacks are relatively inexpensive, and quite portable. However, as the separate jacks bear against the rail bed, special shoring effort may be needed, by placing planks or the like under the lift jacks, to provide added stability to the jacks and/or to prevent the jacks from sinking into the rail bed. Moreover, with the jacks on opposite sides of the car, several people may be needed to jack the railroad car up and down. The overall time and/or cost and/or convenience, from a labor standpoint, to operate such lift jacks, thus may not be too appealing.

Moreover, risks frequently linger on with the use of either the crane or paired lift jacks, as without other bracing or support means, they remain the only support of the railroad car during the time the wheeled truck may be removed from the car, and/or while someone is under the car for servicing. A cross wind may cause the crane-suspended car to sway, and the paired jack-supported car to topple sideways off the jacks to drop onto the rails or rail bed; which can be both dangerous to personnel and destructive to property. Failure of the crane and/or lift line, or of either jack, can also drop the raised car to the rails or rail bed.

The present invention is directed to improved portable jack assembly means that overcome one or more of the drawbacks set forth above.

SUMMARY OF THE INVENTION

One aspect of the present invention provides that the disclosed jack assembly is self contained and relatively lightweight, to be quite portable, to be moved manually and/or with a small crane, truck lift or the like, as needed to different use sites. The disclosed jack assembly may also be operated by one person, completely from only one side of a railroad car, and at almost any rail site.

Another aspect of the present invention provides that the disclosed jack assembly cooperates directly between the track rails and the car frame, providing safe non-yielding, solid metal-to-metal, triangulated support of the railroad car above the track rails, and without the need of auxiliary bracing or supports.

The present invention may consist of a jack assembly having an elongated structural beam of sufficient length to span between and beyond the spaced rails supporting a railroad car. Power lift means, such as a power cylinder, is connected to the beam, operating a car engaging portion that may be moved vertically in a direction transverse to both the beam and the rails. Means are provided to activate the power lift means, and operatively shift the car engaging means. The beam, power lift means and car engaging means are sized: when in a contracted position, to fit with clearance under the railway car, to allow manipulation to a lifting position with the beam on the track rails and under the railroad car; and when in an extended position, to elevate the car engaging means initially against the underside of the railway car and then to lift the car enough above the rails, to remove the car completely from some of its wheels.

The means to activate the power lift means may be mounted as a unitary part of the jack assembly; or may be physically separated from the jack assembly, except for an operative connection therebetween.

DETAILED DESCRIPTION OF ILLUSTRATED EMBODIMENTS

Figure 1:
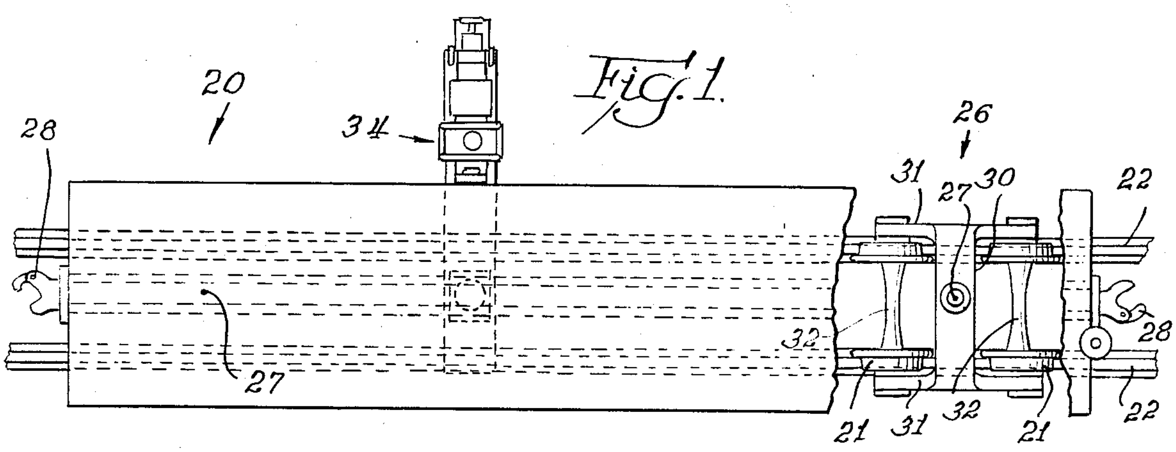
FIG. 1 is a top plan view of a railroad car, partly broken away for clarity of disclosure, and showing one embodiment of the subject jack assembly lifting the car.

In this disclosure, a flat-bed railroad car 20 is illustrated, having flanged wheels 21 adapted to roll on two laterally spaced track rails 22. The railroad car 20 has a frame 24 including a central sill 23 and side channels 25, each elongated in the direction of the rails 22. A wheeled truck assembly 26 is connected to the central sill 23 of the frame 24 at each end of the car 20, to rotate about a substantially vertical axis 27 laterally centered relative to the car. Couplings 28 are connected to the frame 24 at the opposite ends of the car 20.

Each truck assembly 26 illustrated has a cross member 30 and a pair of side frame members 31; and the cross member 30 is coupled at its ends through spring and snubbing means (not shown) to the side frame members 31. One flanged wheel 21 is fixed adjacent each end of axle 32; and two such axles 32 are mounted in bearings (not shown) carried in the opposite respective side frames 31.

A typical railroad car may be approximately ten feet wide, across the exterior of its side sections 25 and/or flooring 33; and ride centered relative the track rails 22, which conventionally may be separated by approximately four and one-half feet. With the wheels 21 on the rails 22, there may be only perhaps 10 inches of vertical clearance between the tops of the rails 22 and the underside of the railway car frame 24, at the central sill 23 and/or at the side channel sections 25.

Figure 2:
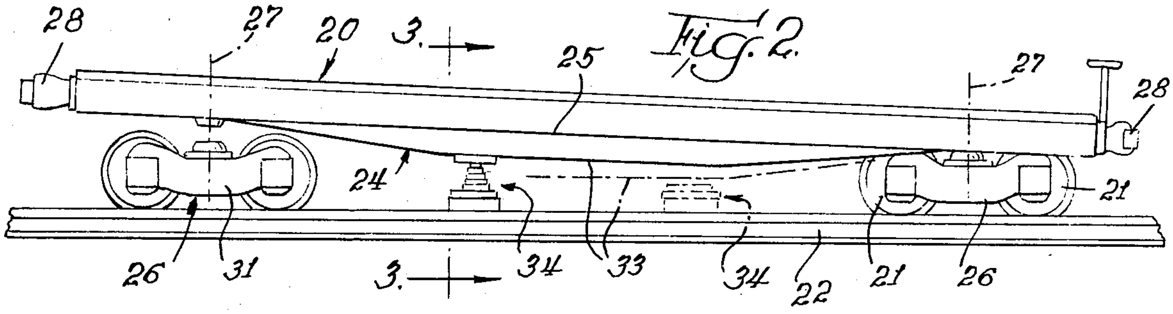
FIG. 2 is a side elevational view of the car and jack assembly illustrated in FIG. 1.

The jack assembly 34, to be disclosed herein, may be used to lift the railway car frame 24 completely off of one wheeled truck assembly 26. This is illustrated in FIG. 2, the jack assembly 34 being located between the truck assemblies 26, but closer to the left truck assembly, and engaging the central sill 23 of the frame 24, preferably where the sill may extend substantially parallel to the underlying rails 22. The jack assembly 34 may lift the frame 24 to a position spaced clear of the left wheeled truck 26; while the frame 24 yet remains supported on the right wheeled truck 26. Each wheeled truck assembly 26 is self contained, and can be easily connected to or separated from the railroad car 20.

The jack assembly 34 has an elongated beam 36 of length sufficient to span between and beyond the track rails 22, and of sufficient strength, when spanned between the rails, to carry the load of the elevated railroad car 20. Compact power lift means 38, illustrated as a power cylinder, is supported on the beam 36. A car engaging plate 40 is supported to be moved by the power lift means 38, transversely toward or away from the beam 36 and rails 22, and against the overlying central sill 23 of the railroad car frame 24. A stop 41 on the beam 36 may be used to engage one of the rails 22, to center the car engaging lift plate 40 of the jack assembly 34 relative to the rails 22, and thus the central sill 23.

Figure 13:
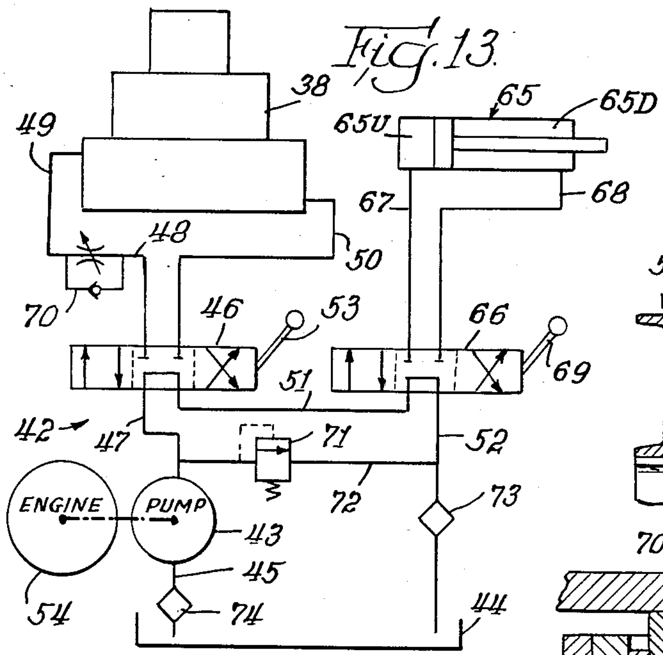
FIG. 13 is a schematic flow diagram of a hydraulic system suited to be used in the jack assemblies illustrated in the previous figures.
Figure 8:
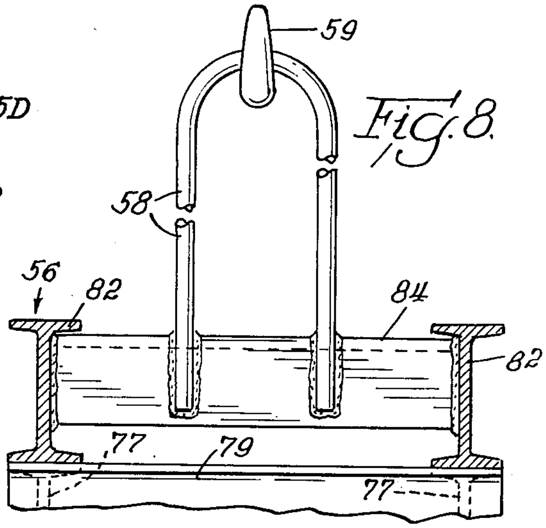

A hydraulic pumping system 42 for activating the power lift cylinder 38 is provided; the system being illustrated in FIGS. 3, 4, 10 and 11, and schematically in the flow circuit of FIG. 13. The pumping system 42 can include a pump 43, a reservoir 44, a control valve 46, and appropriate lines 45, 47, 48, 49, 50, 51 and 52 between these components and the power lift cylinder 38. A handle 53 may be used to shift the control valve 46 between its operative positions. Internal combustion engine 54 may drive the pump 43, to allow use of the jack assembly at virtually any rail site.

The components of the hydraulic pumping system 42 may be located laterally outside of or beyond one side 55 of the railroad car 20, and carried as a unitary part of the jack assembly 34. To provide for this, elongated beam 56 may be welded or otherwise secured to the beam 36, somewhat as an aligned extension of the beam 36. The control handle 53 may also be laterally beyond the side 55 of the railway car 20, to be conveniently reached and shifted by someone standing at this location.

An inverted U-shaped hanger bar 58 can be secured relative to the beam 56, at a location also laterally outside of or beyond the adjacent side 55 of the railroad car 20 when the jack assembly is in its operative lifting position on the rails 22. As illustrated, the hanger bar 58 is between the power lift cylinder 38 and the pumping system 42, at or near the center of gravity of the jack assembly 34. This allows lift line 59 from a small crane (not shown) to be connected to the hanger bar 58, and to elevate and suspend the jack assembly 34, with the beam 36 balanced. As so suspended, the beam in a generally horizontal orientation can be rotated about the vertical axis of the lift line 59 and/or hanger bar 58, for positioning the beam 36 under the railroad car frame 24. Handles 60 secured to beam 56 allows vertical, lateral and rotary manipulation of the suspended jack assembly, by someone standing safely beyond the adjacent side 55 of the railroad car 20.

Mechanical block bars 61 are also carried relative to the beam 36, adapted to be pivoted about journals 62 between raised positions (illustrated in solid in FIG. 5) against stops 64 on the underside of the lift plate 40, and lowered positions (illustrated in phantom in FIG. 5) aligned with the beam 36. The block bars 61 provide a solid brace for supporting the jack assembly lift plate 40 and railroad car 20 in the elevated position, effective as a safety feature, even in the event of failure of the hydraulic system 42 and/or power lift cylinder means 38.

The block bars 61 can be shifted by power cylinder 65 via suitable linkage connected between the beam 36 and block bars 61. The block bar cylinder 65 can be powered by the hydraulic pumping system 42, using a control valve 66 (see FIG. 13, and appropriate lines 45, 47, 51, 67, 68 and 52 between these components and the block cylinder 65. The control valve 66 may be operated by handle 69, also located laterally beyond the side 55 of the railroad car 20.

Each cylinder 38 and 65 is double acting, although the reverse stroke of cylinder 38 is only partial.

As illustrated in FIG. 13, each control valve 46 and 66 may be a four-way three-position valve having a normal centered position that closes off the connected respective cylinder 38 or 65, and bypasses the fluid flow via lines 47 and 51, and lines 51 and 52 past the associated cylinder. Each valve 46 and 66 can be shifted by its respective handle 53 and 68, either to the right or left, to different operative positions. Thus, one operative position of each valve directs fluid under pressure from the pump 43 to one side of the cylinder, while venting the opposite side of the cylinder to the reservior 44, to shift the cylinder in one direction; and another operative position of each valve reverses the sides of the cylinder that are respectively pressurized and vented, to shift the cylinder in the opposite direction.

Flow control valve 70, in lines 48 and 49 to the retracting side of the lift cylinder 38, operates in one condition to admit pressurized fluid into this side of the cylinder only at a throttled rate, and in another condition to allow unregulated venting of fluid from this side of the cylinder back to line 48. The input line 51 to the block bar valve 66 is from the outlet of the lift cylinder valve 46. Thus, the valve 66 only receives fluid under pressure from the pump 43 when the valve 46 is in the centered position as shown . . . blocking off the lines 48 and 50 to power cylinder 38 and bypassing the flow from the pump 43.

Pressure relief control valve 71 in line 72, may bypass pressurized fluid between the pump 43 and reservior 45, in the event the respective cylinder 38 or 65 has been completely presurized and shifted accordingly, while the control valve 46 or 66 has not yet been shifted to the centered closed-bypass position. Suitable filters 73 and 74 may be in the return line 52 and suction line 45 respectively.

A foot 75 can be supported at the end of the beam 56, to be set adjustably in a vertical direction to a firmed position against the underlying rail bed surface 76, and locked as so adjusted. The foot 75 stablizes the jack assembly 34 when supported on the two track rails 22 while the lift plate 40 is spaced from the overlying railroad car frame 24, before or after lifting the car.

As illustrated in FIGS. 5–8, the beam 36 can be formed of two structural I-beams 77 held laterally spaced apart by end angles 78 and 79, and by intermediate plate 80, each welded or otherwise secured to and between the I-beams. The lead end angle 78 may be oriented with its separate legs angled at 45 degrees relative to the beam, so that the inclined lower leg may help ride the suspended remote end of the beam 36 onto the remote track rail 22, as the jack assembly 24 is being positioned from the opposite car side 55. The beam 56 can be formed of two I-beams 82, overlapped with and welded at 83 to the I-beams 77. The I-beams 82 are held laterally spaced apart by angles 79 and 84, and by end plate 85, each welded or otherwise secured to and between the I-beams. The hanger bar 58 is welded to angle 84.

Each block bar 61 is formed of a shaft 86 rotated in journals 62, spaced arms 87 welded to the shaft, and cross members 88 and 89 welded to and between the arms. The block bars arms 87 are located laterally between the separate I-beams 77 of beam 36; and the journals 62 are secured to the I-beams. A link 91 is keyed to one of the shafts 86 outwardly of one I-beam 77. The power cylinder 65 is pivoted at 92 to the link 91, and at 93 to a brace 94 welded to the same side of the I-beam. A link 96 is keyed to each of the shafts 86, outwardly of the other I-beam 77; and a rigid L-shaped link 97 is pivoted at 98 to the ends of the links 96.

The block bar links 91, 96 and 97 are set to move the cross members 88 of the block bars 61 in unison but in opposite directions, and from opposite sides of the lift cylinder 38, to have the cross members 88 in the raised positions simultaneously, and against the lift plate 40 and stops 64; or in the lowered positions, to be somewhat parallel to the beam 36.

The brace bar journals 62 are located just laterally beyond the stops 64 of the car engaging lift plate 40, and generally evenly spaced therefrom. The bars 61 converge then upwardly from the journals 62 toward the stops 46, when the cross member 88 is engaging the lift plate 40 and stops. This configuration mechanically locks the brace bars 61 in the raised bracing position against the lift plate 40 and stops 46, independently of continued urging by the brace bar cylinder 65 of the cross members against the stops 64. Thus, once the brace bars 61 are set, the jack assembly 34 is stable even without any pressure in either cylinder 38 or 65.

The car engaging lift plate 40 is carried by swivel connection 101 relative to top plate 102 of the lift cylinder 38. This allows the overlying frame 24 of the railroad car 20, to fit generally flat against the lift plate 40 for effective load distribution. Moreover, as the plate 40 lifts the adjacent end of the car frame 24, the car frame rotates slightly about the remote wheeled truck assembly 26 still suporting the frame; and the swivel connection 101 accomodates this car frame rotation.

The illustrated swivel connection 101 has a post 103 welded to the lift plate 40, and the post is fitted into annular bearing member 105 having a convex semi-spherical face that swivels relative to a complementary concave semi-spherical face formed on annular bearing member 106 held within recess 107 in top plate 102. With this connection 101, if desired, plate 40 can be easily separated from the cylinder 38, by merely lifting it, to part the components at the semi-spherical faces.

The power lift cylinder 38 has an outer sleeve 109 welded or otherwise connected within an opening to the plate 80. As noted earlier, the base plate 80 is secured to the I-beams 77, as by nut and bolt means 111. A sleeve 114 is fitted in and is axially movable within the sleeve 109; and concentrically arranged successively smaller sleeves 115, 116, 117, 118 and 119 are fitted within and axially moveable relative to the respective adjacent larger sleeves. Bottom plate 121 is welded to the lower end of the outer sleeve 109 to seal the lower end of the cylinder 38; and the top plate 102 is welded to the inner sleeve 119, to seal the upper end of the cylinder.

Annular outside seat members 123, 124, 125, 126, 127 and 128, and annular inside seat members 129, 130, 131, 132, 133 and 134 are welded or secured by snap rings to the opposite respective lower and upper ends of the sleeves. The outside cylindrical faces of the outside seat members, and the inside cylindrical faces of the inside seat members cooperate respectively with the inside and outside cylindrical faces of the respective paired adjacent sleeve, to allow axial movement of the adjacent sleeves while maintaining them axially aligned.

A downwardly facing end shoulder 135 is formed on each inner seat member 129, 130, 131, 132, 133 and 134, projecting inwardly beyond the regular inside cylindrical face of its sleeve; and an opposing upwardly facing shoulder 136 is formed on each outer seat member 123, 124, 125, 126, 127 and 128, projecting outwardly beyond the regular outside cylindrical face of its sleeve. The shoulders 135 and 136 of each adjacent pair of sleeves abut to limit the fully extended relative position of the paired sleeves. Annual grooves 138 in the seat members 123–134 hold seals or packing rings (not shown), to seal the adjacent paired sleeves together. Overall, the telescoped sealed sleeves define a single cylinder chamber 38U.

Pressure line 50 is connected between the lift control valve 46 and the bottom plate 121, opening into the cylinder chamber 38U. Hydraulic fluid admitted to the cylinder chamber 38U via line 50, extends the cylinder 38 axially. The largest movable sleeve 114 is double acting, having an annular pressure chamber 36D defined between the adjacent sleeves 109 and 114 and the sealed seat members 123 and 129 secured to these sleeves. Fluid pressure lines 48 and 49 connect valve 46 to this annular chamber 36D, via flow control valve 70. Upon admitting a throttled flow of fluid under pressure to chamber 36D, with the chamber 36D connected to the reservoir, sleeve 114 will in time become completely retracted.

Figure 9:
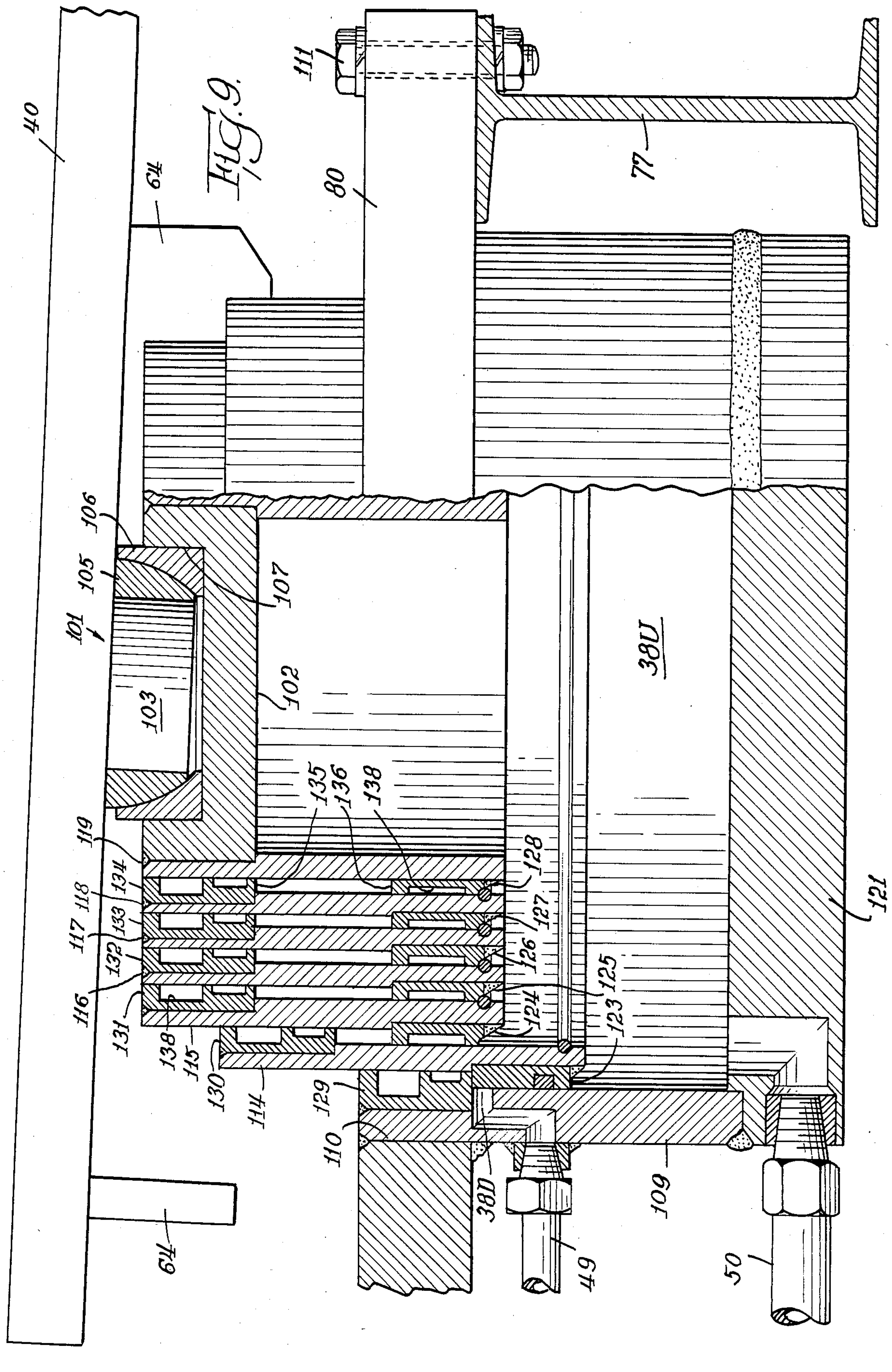
FIG. 9 is a greatly enlarged sectional view of the power lift cylinder used in the disclosed jack assembly, as seen generally from line 9—9 in FIG. 6, except being shown in a different operative position.

As the power cylinder 38 contracts, the top ends of its sleeves generally line up, as illustrated in FIG. 9, by the contracted sleeves 115, 116, 117, 118 and 119. Moreover, when completely contracted, the top sleeve ends will generally line up with the top of plate 80, and the bottom sleeve ends will be proximate the bottom plate 121.

The illustrated power lift cylinder 38 has six stages of axial extension, one for each pair of adjacent sleeves. Because of this, the operative power stroke of cylinder 38 can be well in excess of the length of any sleeve individually or the overall minimum silhouette height of the contracted jack assembly beam 36, power lift means 38, and lift plate 40. The operative power stroke of the lift cylinder 38 will be the total of the separate strokes of all paired sleeves.

Figure 10:
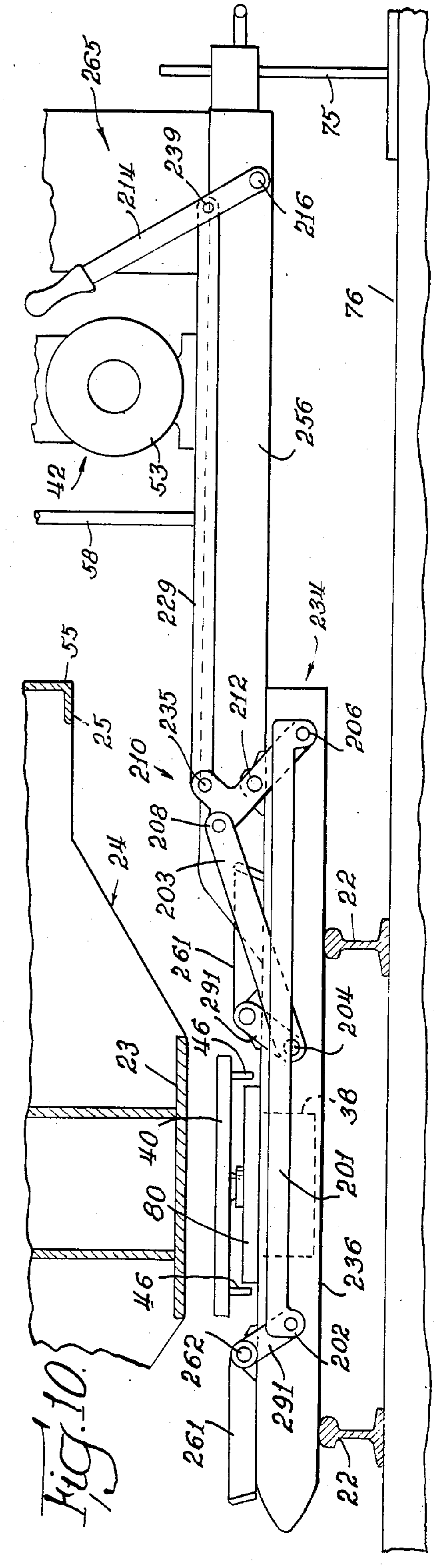
FIG. 10 is an elevational view similar to FIG. 3, except to a slightly larger scale and as seen from the opposite direction, illustrating another embodiment of the jack assembly positioned on the rails and with vertical clearance under the railroad car.

A modified jack assembly 234 is illustrated in FIG. 10, having manual means 265 to shift the block bars 261 between the raised and lowered positions. Each block bar 261 is pivoted at 262 to the beam 236, and a link 291 is keyed to rotate with each block bar 261 about this pivot. Two links 201 and 203 are connected: at corresponding ends, at 202 and 204 respectively, to the ends of the links 291 spaced from the pivots; and at the opposite ends, at 206 and 208, to remote ends of lever 210. The lever 210 is pivoted intermediate such ends at 212 to the beam 236. A handle 214 is pivoted at 216 to the beam 256, at a location laterally beyond the sides of the railway car, to be manually moved conveniently by someone next to the car 20. A link 229 is connected at 235 and 239 respectively between the lever 210 and handle 214.

The linkage is set, upon outward movement of handle 214, to swing the block bars 261 in opposite directions around the respective mounting pivots 262, from the lowered positions illustrated, to elevated positions (not shown) underlying the lift plate 40 and against the stops 46. However, as noted above with the hydraulically powered block bars 61, one elevates the block bars only after the power lift means 38 has been fully extended, to have the car frame 24 raised above the track rails 22. Hydraulic system 42 powered by engine 53 may be used to power the lift means 38, as noted above with respect to the first illustrated embodiment; although it will be understood that the block bar power cylinder 65 and its control valve 66 can be eliminated.

In the modified jack assembly 234, the beam 236 is also sufficiently long to span between and beyond the track rails 22; and foot 75 may be adjustably mounted at the end of the beam 256 remote from the rails 22, to stablize the jack assembly 234 when the same is positioned in place on the track rails 22 under the railroad car 20, but is not in actual use lifting the railroad car 20. The jack assembly may be moved about, to and from its operative position underlying the railroad car 20, by the hanger 58.

Figure 11:
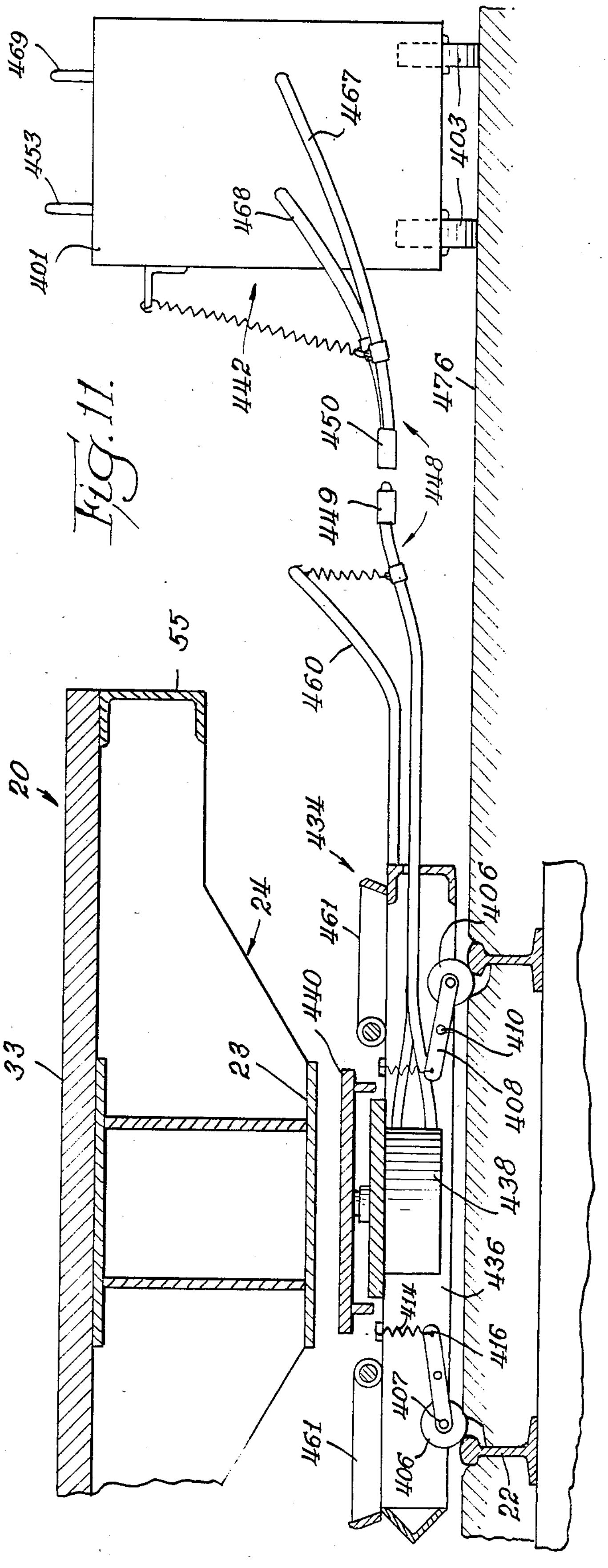
FIG. 11 is an elevational view similar to FIG. 10, except illustrating yet another embodiment of the jack assembly.

Another modified jack assembly 434 is illustrated in FIG. 11, particularly suited for use in maintenance buildings where it is common to have a generally smooth concrete floor 476, with the track rails 22 being recessed within the floor, to present rail tops that line up just about even with or slightly above the floor.

In this embodiment, the power lift cylinder means 438 and hydraulic pumping system 442 are physically separated from one another, connected together only by suitable flexible hydraulic lines 448, 467 and 468 that may be readily connected to and separated from one another at couplings 449 and 450. The hydraulic pumping system 442 can be supported on a cart 401 having wheels 403 to be mobile for easy movement about on the floor, manually or under some form of power. Control handles 453 and 469 may conveniently be carried on the cart 401 for operating control valves (not shown) for the lift cylinder 438 and block bar cylinder (not shown).

The elongated beam 436 may be similar to that previously illustrated, including being long enough to span between and beyond the track rails 22; and supporting the power lift means 438, lift plate 440, and block bars 461. However, no beam extension is connected to beam 436, as the hydraulic pumping system 442 instead is carried separately on the cart 401, as noted.

The beam 436 is illustrated supported on retractable rollers 406. To provide this, each roller 406 is rotated at 407 to a lever 408 pivoted at 410 to the beam 438, and tension springs 414 are connected at 416 and 418 respectively between the other end of each lever 410 and the beam 436. As connected, the springs 414 have sufficient carrying capacity to support the jack assembly beam 436 elevated above the floor 476 on the rollers 406, to allow the jack assembly 234 to be rolled about easily. This would include positioning the beam 436 across the rails 22 with the lift plate 440 under the central sill 23 of the car frame 24. Upon the power lift cylinder 438 being progressively shifted against the car 20 to the extended position, the weight of the railroad car 20 overcomes the springs 414, and the linkage allows the rollers 406 to retract sufficiently to where the beam 236 is supported directly on the track rails 22.

The rollers 406 may also serve as locators for centering the jack assembly 434 relative to the track rails 22, by dropping into the clearance spaces between the rails and the supporting floor surface 476. A handle 460 may be connected to the beam 438, projecting laterally beyond the adjacent side 55 of the car 20, and above the floor 476. This allows the operator to move the jack assembly 434 around on the rollers 406, and in locating it properly and conveniently, without having to crawl under the frame 24 of the car.

Figure 12:
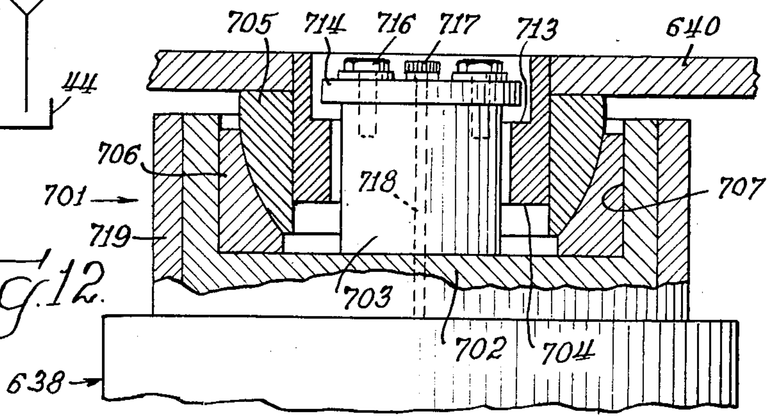
FIG. 12 is a sectional view similar to FIG. 8, except of another embodiment of swivel connection.

A modified swivel connection 701 is illustrated in FIG. 12, that nonremovably supports the lift plate 640 to swivel relative to the upper end of the lift cylinder 638. The connection 701 has a post 703 welded to top plate 702 of the lift cylinder 638, the top plate 702 being welded to the lift cylinder inner sleeve 719. A tube 704 is welded to the lift plate 640, and telescopes over the post 703. Annular bearing members 705 and 706 are fitted in sleeve recess 707, between the tube 704 and the inner sleeve. The bearing members 705 and 706, respectively having complementary convex and concave semi-spherical faces, that swivel relative to one another.

The lift plate tube 704 has an upwardly facing annular shoulder 713 formed thereon; and plate 714 is fitted within the tube 704, but sized to butt against the shoulder 713. The plate 714 is removably secured by bolts 716 to the post 703. Upward movement of the lift plate 640 relative to the post 703 is possible then, only until the tube shoulder 713 engages the plate 714. Bleed valve 717 may be secured in a bore 718 extended through the post 703, to communicate with the pressure chamber defined within the lift cylinder 638.

OPERATION OF THE INVENTION

The contracted jack assembly 34 can be suspended at hanger bar 58, to be moved both laterally and vertically, to be adjacent one side 55 of the railway car 20, and spaced just above the tops of the rails 22. The jack assembly 34 will be located between the truck assemblies 26, typically closer to the truck assembly to be removed. As so suspended, the jack assembly can be moved to be close to and parallel to the adjacent side 55 of the car, and then rotated approximately 90 degrees about the vertical axis through the hanger bar, to swing the elongated beam 36, with the power lift means 38 and lift plate 40 thereon, under the railroad car frame 24.

Alternatively, the suspended jack assembly 24 can be orientated generally perpendicular to the adjacent side 55 of the car, and then via lateral movement of the suspending cable 59 toward the car side, can be moved to fit the elongated beam 36, the power lift means 38 and lift plate 40 directly under the railroad car frame 24; or alternatively, a combination of such lateral cable movement and rotary beam movement may be used.

The beam 36 is sufficiently long to extend between and beyond the rails 22, so as to lie across and over the rails. The height of the contracted jack assembly 34, between the bottom of the beam 36 and the top of the lift plate 40, is sufficiently small to fit with clearance over the track rails 22 and under the car frame 24. Approximately 1-2 inches of clearance may be needed between the rail, jack assembly and car components, as a practical minimum; although a larger clearance of course could be possible.

The power stroke of lift cylinder 38 may be between perhaps 10-25 inches, sufficient to lift the adjacent end of the car frame 24 completely off of the adjacent wheeled truck assembly 26, while the other end of the frame 24 yet remains supported on the other wheeled truck 26. Because the jack assembly 34 cooperates with the car frame 24 between the wheeled truck assemblies 26, the frame 24 at the adjacent wheeled truck assembly 26 is lifted a greater distance than the operating stroke of the lift cylinder 38.

After the jack assembly 34 has been positioned over the rails 22 and under the railroad car 20, both valves 46 and 66 are closed as illustrated; and the engine 54 and pump are operated. The valve 46 is then shifted to the left to connect lines 47 and 50, and lines 48 and 51, to extend the lift cylinder 38.

Figures 5, 6:
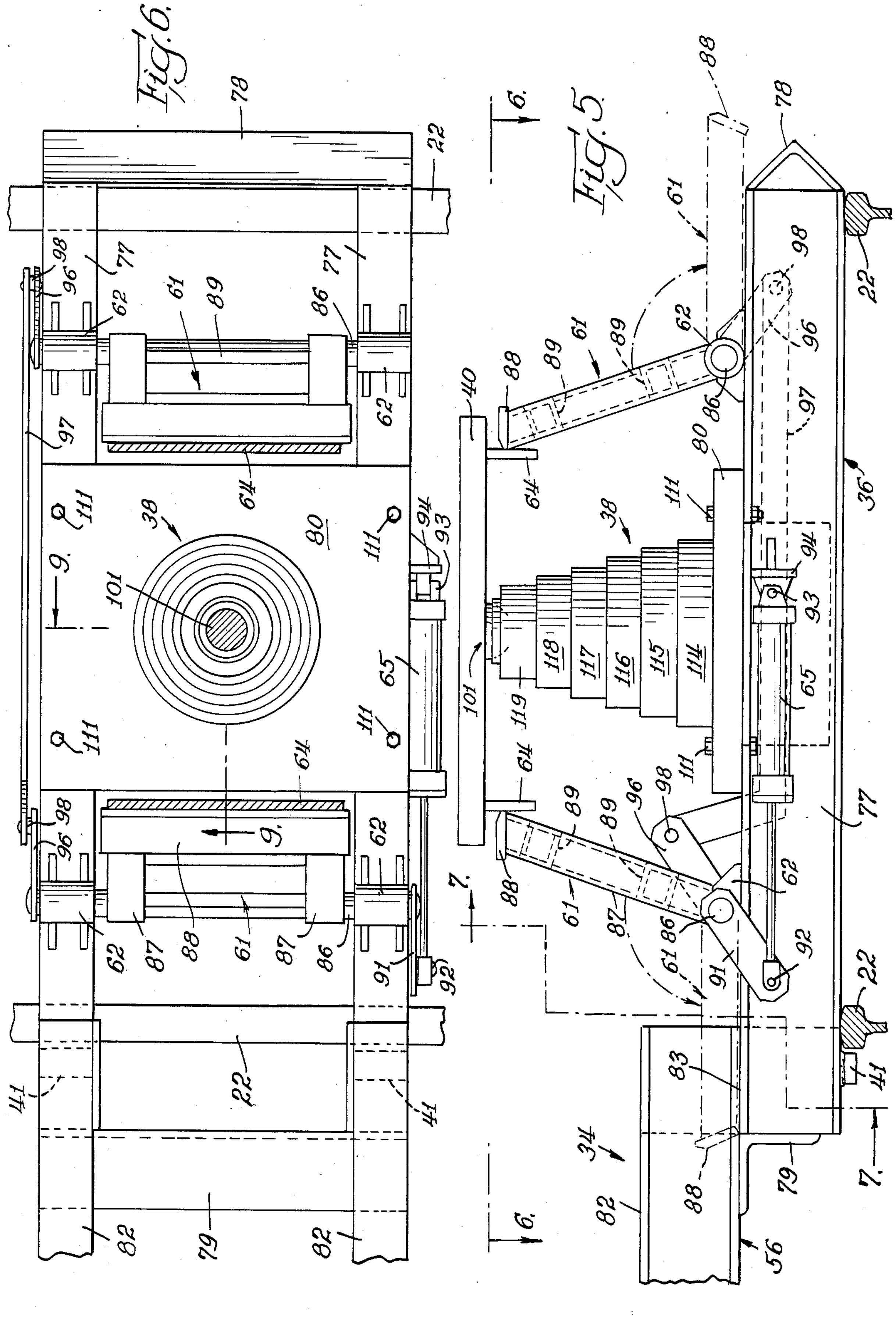
FIG. 5 is an elevational view similar to FIG. 3, but to yet a somewhat larger scale, illustrating a portion of the jack assembly, including the power cylinder and some operating linkages, but in a slightly different position representing when the jack assembly is initally set or released relative to the railroad car.
FIG. 6 is a top plan view of that portion of the jack assembly illustrated in FIG. 5.
Figure 7:
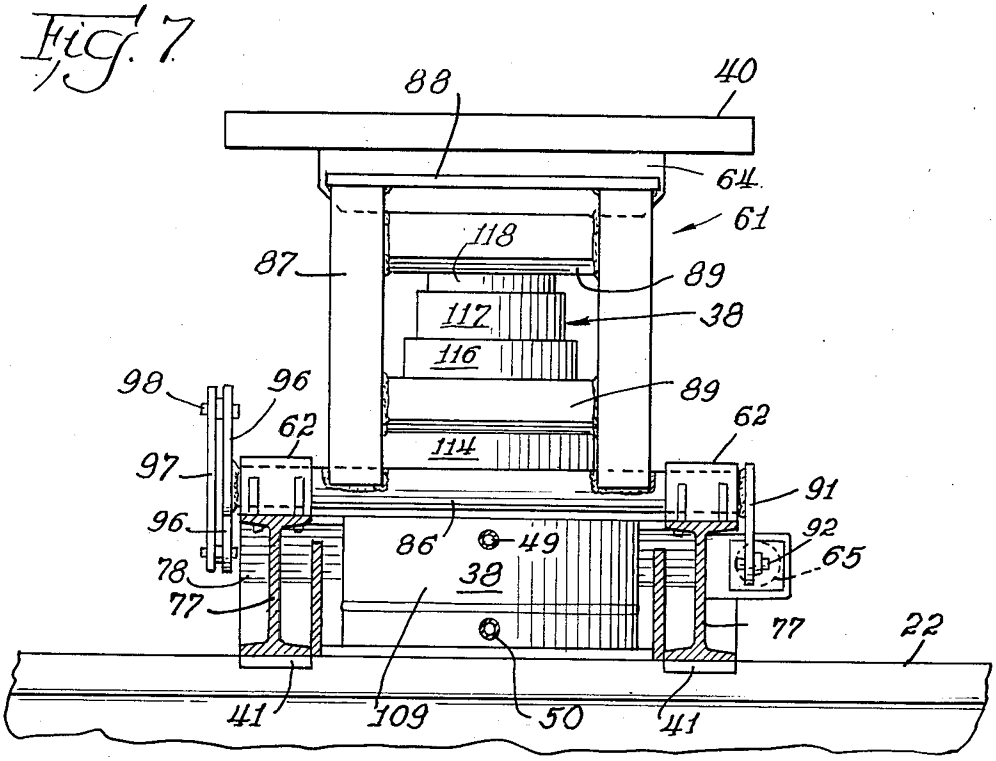
FIGS. 7 and 8 are elevational sectional views of the jack assembly, as seen respectively from line 7—7 in FIG. 5, and 8—8 in FIG. 4.

During extension of the power lift cylinder 38, the largest movable sleeve 114 will be extended first. Engagement of the facing shoulders 135 and 136 on the paired sleeves limits the axial extension. Thereafter, the second largest movable sleeve 115 will be extended next; and then each next largest sleeve will be successively extended, until the power lift cylinder 38 is fully extended, as illustrated in FIG. 5. An intermediate position is illustrated in FIG. 9, with the paired sleeves 109 and 114 being fully extended; the paired sleeves 114 and 115 being partially extended; and the remaining sleeves being completely contracted.

In the fully extended position of lift cylinder 38 as illustrated in FIG. 5, the block bars 61 can be elevated to be against the lift plate stops 64. To operate the block bars cylinder 65, valve 46 is returned to the closed illustrated position; and valve 66 is shifted to the right to connect lines 51 and 67, and lines 68 and 52. Pressurized fluid is admitted then to chamber 65U, and chamber 65D is vented to the reservoir 44; until the block bars 61 are raised against the lift plate stops 64, as illustrated in FIG. 5.

Figure 3:
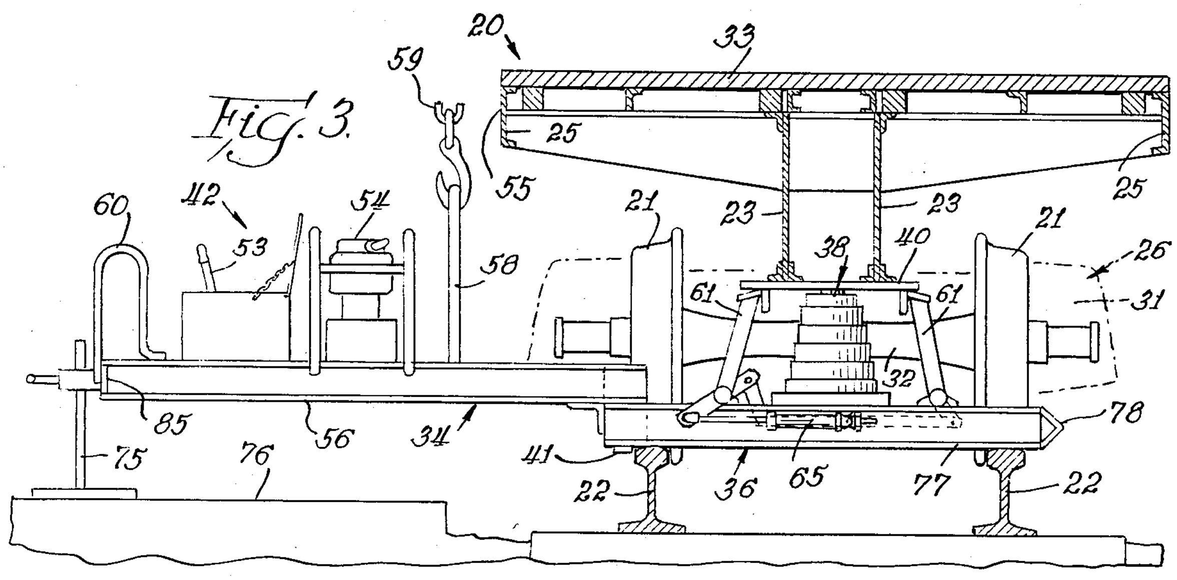
FIG. 3 is an elevational sectional view, as taken generally from line 3—3 in FIG. 2, but to a somewhat larger scale.
Figure 4:
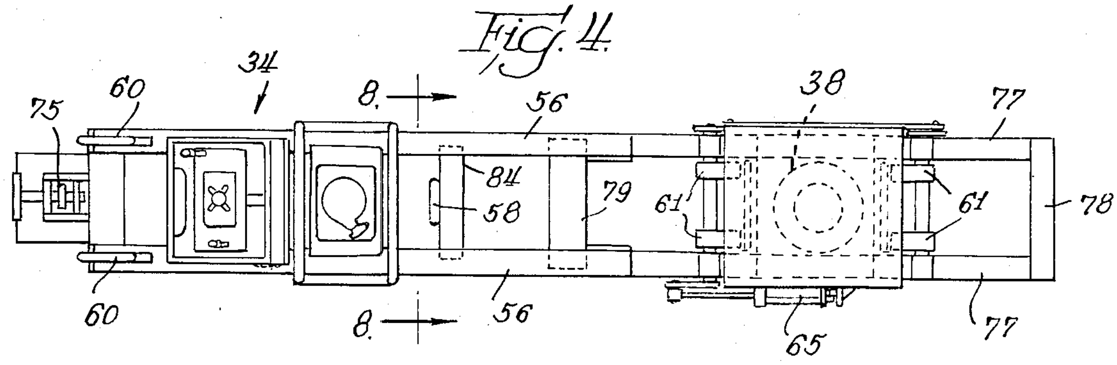
FIG. 4 is a top plan view of the jack assembly of FIG. 3, but with the railroad car eliminated for clarity of disclosure.

To set the raised jack assembly from the position illustrated in FIG. 5, some hydraulic fluid must be bled from the lift cylinder chamber 38U, to lower the lift plate 40 against the block bars, as illustrated in FIG. 3. To do this, the pressure at line 47 is first dropped, such as by stopping the engine 54 and pump 43. Alternatively, bypass valve 71 may be opened, or a clutch (not shown) between the engine 54 and pump 43 may be disengaged. Valve 66 is then shifted to the illustrated closed position, to keep the block bars raised; while the valve 46 is shifted to the right to connect lines 47 and 48, and lines 50 and 51. This vents the lift chamber 38U to the reservoir 44. The lines 51 and 52 are sized to limit the fluid escaping from the cylinder chamber 38U, to lower the lift plate 40 slowly, until it bottoms against the block bars 61. Valve 46 is then shifted to the illustrated position, closing off both lines 48 and 50.

When blocked as illustrated in FIG. 3, the jack assembly 34 comprises a solid metal-to-metal triangulated support between the track rails 22 and elevated railroad car 20, independently of reduced fluid pressure in the cylinders 38 or 65. The underlying wheeled truck assembly 26 may be separated from and rolled out from under the car, and be replaced with another truck assembly; or other servicing can now be done under the railroad car 20.

To remove the jack assembly from the lifting position illustrated in FIG. 3, the lift plate 40 must first be raised again to the position of FIG. 5, to allow the block bars 61 to be lowered. After this is completed by extending the lift cylinder 38 fully, valve 46 is closed to the position illustrated, and valve 66 is shifted to the left. This connects lines 51 and 68, and 67 and 52, to pressurize chamber 65D of the power cylinder 65, and to vent chamber 65U; which lowers the block bars 61. When the block bars 61 have been lowered completely, valve 66 is shifted to the closed illustrated position.

To lower lift cylinder 38, the pressure in line 47 must again be dropped, as noted above. The valve 46 is then shifted to the right to connect lines 47 and 48, and lines 50 and 51; whereby chamber 38U is vented to the reservoir 44. The car load on the lift plate 40 contracts the jack assembly most of the way down, the smallest sleeve 119 retracting first, and each sucessively larger sleeve retracting next.

Because of the needed clearance between the completely contracted jack assembly 24 and the railroad car 20, the railroad car frame 24 will bottom on the underlying wheeled truck assembly 26, with the largest sleeve 114 yet being partially extended. To completely retract the sleeve 114, the line 47 is repressurized, and valve 46 is shifted to the right, to connect lines 47 and 48, and lines 50 and 51. This throttles pressurized fluid through control valve 70 to the annular chamber 38D, until the lift cylinder 38 is fully retracted. Fluid flow control is desirable because of the large difference between the areas of the chambers 38U and 38D, chamber 38U being possibly 10–20 times larger than chamber 38D; and correspondingly more fluid must be vented from chamber 38U than admitted to chamber 38D.

When the lift cylinder 38 is completely retracted, the valve 46 may be shifted to the illustrated closed position, the engine 54 stopped, and the jack assembly removed from under the railroad car 20.

Handles 53 and 69 for the control valves 46 and 66 may be located at a convenient safe location, laterally beyond the adjacent side 55 of the railroad car 20.

The lift cylinder 38 and hydraulic pressure system 42 can be mounted as a unitary jack assembly 34 or 234; or can be physically separated as jack assembly 434 and pressure system 442, connected together only by flexible pressure lines. The block bars 61 may be shifted by hydraulic power cylinder 65; while block bars 261 may be shifted by manual handle 214.

Each disclosed jack assembly cooperates directly between the track rails 22 and the car frame 24, to provide a solid metal-to-metal braced support of the elevated railway car, without the need of auxiliary shoring. The triangulated support of the railroad car on the jack assembly, between the two track rails and the central sill, is very stable . . . resisting even high cross winds. Each disclosed jack assembly is relatively lightweight, capable of being moved about manually and/or with a small crane, truck lift or the like; and thereby is quite portable, for use at different sites. One person can use the jack assembly effectively, and from only a single side of the railroad car.

Although the invention has been described with respect to specific illustrated embodiments, it should be understood that the invention is not limited to such embodiments. Additional modifications and/or additions may be included by those skilled in the art, without departing from the scope of the invention as defined by the following claims.

What is claim as our invention is:

1. For use with a railroad car supported by spaced wheeled truck assemblies to roll on two laterally spaced track rails, a jack assembly comprising the combination of:

a pair of spaced apart, elongated structural beams of a length to extend across the rails; said beams having bottom surfaces for contact with said rails to deliver the load received by said beams to the rails;

power lift means disposed between the beams, and a plate connected to said power lift means and to each said beam to deliver all the load received by said power lift means from said car engaging means to said beams;

a car engaging means coupled to the power lift means to be moved in a direction transverse to the beams;

said beams, car engaging means and power lift means being sized, when the power lift means is contracted, to fit with clearance between the tops of the track rails and the lowest portion of the railroad car, in order to manipulate the said jack assembly from one side of the railroad car to an operating position wherein the beams, car engaging means and power lift means are disposed under the railroad car and the beams extend across the rails in contact therewith, and said power lift means, when in said operating position, having an operative stroke sufficient to move the car engaging means against the overlying railroad car and then to lift said car to an elevated car retaining position;

means for activating the power lift means; and further including block means carried relative to the beam, said block means being adapted to be moved between an inoperative position spaced clear of the car engaging means and an operative position against the car engaging means, when the latter is raised, effective to hold the car engaging means so raised independently of the activating means and the power lift means, said block means including at least one rigid link having an end pivoted upon said beam and an opposite free end engaged with said car engaging means when in said operative position and disengaged from said car engaging means when in said inoperative position.

2. A jack assembly according to claim 1, further wherein said beam includes a portion that extends to laterally outside of and beyond said one side of the railway car, when the jack assembly is in said operating position, and wherein said activating means for the power lift means is secured to and supported on said beam portion as a unitary part of the jack assembly, to also be laterally outside of and beyond said one side of the railway car when the beam is in said operating position.

3. For use with a railroad car supported by spaced wheeled truck assemblies to roll on two laterally spaced track rails, a jack assembly comprising the combination of:

a pair of spaced apart, elongated structural beams of a length to extend across the rails; said beam having bottom surfaces for contact with said rails to deliver the load received by said beams to the rails;

power lift means disposed between the beams, and a plate connected to said power lift means and to each said beam to deliver all the load received by said power lift means from said car engaging means to said beams;

a car engaging means coupled to the power lift means to be moved in a direction transverse to the beam;

said beams, car engaging means and power lift means being sized, when the power lift means is contracted, to fit with clearance between the tops of the track rails and the lowest portion of the railroad car, in order to manipulate the said jack assembly from one side of the railroad car to an operating position wherein the beams, car engaging means and power lift means are disposed under the railroad car and the beams extend across the rails in contact therewith, further wherein said beam includes a portion that extends to laterally outside of and beyond said one side of the railway car, when the jack assembly is in said operating position and wherein said activating means for the power lift means is secured to and supported on said beam portion as a unitary part of the jack assembly, to also be laterally outside of and beyond said one side of the railway car when the beam is in said operating position, further including hanger means connected to said portion of the beam, between said activating means and the power lift means, near the center of gravity of said jack assembly, to allow the jack assembly to be suspended from the hanger mean in a balanced condition, and to allow the beam, held substantially horizontal, to be moved to said operating position under the railroad car and on the rails while having said hanger means remain laterally outside of and beyond said one side of the railway car.

4. A jack assembly according to claim 1, further including means to shift the block means between the inoperative and operative positions, and said shift means including a control located outwardly and laterally beyond the side of the railway car, to allow the block means to be shifted between the inoperative and operative positions from said control location.

5. A jack assembly according to claim 4, further wherein said shift means also includes a power cylinder carried relative to the beam and connected between the beam and the block means, and pump means for powering said power cylinder, responsive to the use of said shift means control.

6. A jack assembly according to claim 5, further wherein said power lift means is an expansible cylinder, and wherein said pump means for powering said power cylinder and said activating means for the power lift means expansible cylinder are one and the same.

7. A jack assembly according to claim 6, further wherein said power lift means is comprised of a plurality of adjacent, concentrically arranged sleeves, the adjacent pairs of such sleeves being sealed and axially movable relative to one another, the operative power stroke of the power lift means being the sum of the axial movements of all adjacent pairs of such sleeves.

8. A jack assembly according to claim 6, further wherein said beam includes a portion that extends to laterally outside of and beyond one side of the railway car, when the jack assembly is in said operating position, and wherein said one and same activating means and pump means are secured to and supported on said beam portion as a unitary part of the jack assembly, to also be laterally outside of and beyond said one side of the railway car when the beam is in said operating position.

9. A jack assembly according to claim 8, further including a foot adjustably secured relative to the beam portion at a location laterally outside of and beyond said one side of the railway car, when the beam is in said operating position, to extend to and be supported on an underlying surface, to stablize the beam support on the rails.

10. A jack assembly according to claim 4, further wherein said shift means also includes linkage carried relative to the beam, wherein said shift means control includes a handle carried relative to the beam, and wherein said linkage is connected at one end to the block means and at the opposite end to the handle.

11. A jack assembly according to claim 1, further including swivel means operating between the car engaging means and the power lift means, to allow limited swivel action of the car engaging means relative to the power lift means.

12. A jack assembly according to claim 1, further wherein said power lift means is connected to the beam at a location between where said beam, in the operating position, is adapted to engage the spaced track rails; and wherein said car engaging means is adapted to be moved against and lift the railroad car at a location between the spaced track rails, to provide that said jack assembly defines a triangulated support between the spaced track rails and lifted railroad car.

13. A jack assembly according to claim 12, further wherein said car engaging means is adapted to be moved against and lift the railroad car at a central sill of the railroad car, to provide that said jack assembly defines a triangulated support between the spaced track rails and the central sill of the lifted railroad car.

14. A jack assembly as claimed in claim 1 wherein said beams include top surfaces and wherein said plate connecting said power lift means to each said beam rests upon said top surfaces.

15. A jack assembly as claimed in claim 14 wherein said power lift means, when contracted, is of a vertical height which is less than the total vertical height of said beams and said plate.

16. A jack assembly as claimed in claim 15 wherein said power lift means is disposed such that, when contracted, its upper end is aligned with the top of said plate.

17. A jack assembly according to claim 16, further wherein said power lift means is comprised of a plurality of adjacent, concentrically arranged sleeves, the adjacent pairs of such sleeves being sealed and axially movable relative to one another, the operative power stroke of the power lift means being the sum of the axial movement of all adjacent pairs of such sleeves.

18. A jack assembly as claimed in claim 16 further comprising the combination of:

rigid block means carried on the beams, and adapted to be moved between an inoperative position spaced clear of the car engaging means and an operative position against the car engaging means, when the car engaging means is raised, effective to hold the car engaging means so raised independently of the fluid pump means and the power lift means.

19. A jack assembly according to claim 18, further including means to shift the block means between the inoperative and operative positions, and said shift means including a control located outwardly and laterally beyond the side of the railway car, to allow the block means to be shifted between the inoperative and operative positions from said control location.

20. A jack assembly according to claim 18, further wherein said beam includes a portion that extends to laterally outside of and beyond said one side of the railway car, when the jack assembly is in said operating position, and wherein said fluid pump means for the power lift means is secured to and supported on said beam portion as a unitary part of the jack assembly, to also be laterally outside of and beyond said one side of the railway car when the beam is in said operating position.

21. A jack assembly according to claim 20, further including hanger means connected to said portion of the beam, between said fluid pump means and the power lift means, near the center of gravity of said jack assembly, to allow the jack assembly to be suspended from the hanger means in a balanced condition, and to allow the beam, held substantially horizontal, to be moved to said operating position under the railroad car and on the rails while having said hanger means remain laterally outside of and beyond said one side of the railway car.

22. A jack assembly according to claim 19, further wherein said shift means also includes a power cylinder carried relative to the beam and connected between the beam and the block means, and said pump means for said power lift means also being used for powering said power cylinder responsive to the use of said shift means control.

23. A jack assembly according to claim 22, further wherein said beam includes a portion that extends to laterally outside of and beyond said one side of the railway car, when the beam is in said operating position, and wherein said fluid pump means for the power lift means is secured to and supported on said beam portion as a unitary part of the jack assembly, to also be laterally outside of and beyond said one side of the railway car when the beam is in said operating position.

24. A jack assembly according to claim 23, further including hanger means connected to said portion of the beam, between said fluid pump means and the power lift means, near the center of gravity of said jack assembly, to allow the jack assembly to be suspended from the hanger mean in a balanced condition, and to allow the beam, held substantially horizontal, to be moved to said operating position under the railroad car and on the rails while having said hanger means remain laterally outside of and beyond said one side of the railway car.

25. A jack assembly according to claim 18, further wherein said power lift means is connected to the beam at a substantially centered location between where said beam, in the operating position, is adapted to engage the spaced track rails; and wherein said car engaging means is adapted to be moved against and lift the railroad car at a substantially centered location laterally between the spaced track rails, to provide that said jack assembly defines a triangulated support between the spaced track rails and the lifted railroad car.

26. For use with a railroad car supported by spaced wheeled truck assemblies to roll on two laterally spaced track rails, a jack assembly comprising the combination of:

an elongated structural beam of sufficient length to extend between and beyond the rails;

power lift means connected to the beam, and a car engaging means coupled to the power lift means to be moved in a direction transverse to the beam;

said power lift means, when in an operating position, having an operative stroke sufficient to move the car engaging means against an overlying railroad car and then to lift said car to be elevated, car retaining position, enough above the rails to remove the car completely from one of the wheeled truck assemblies;

fluid pump means for activating the power lift beams;

at least two blocks pivotally connected to the beam on opposite sides of the power lift means and adapted to be moved between an inoperative position spaced clear of the car engaging means and an operative position against the car engaging means, when the car engaging means is raised to the elevated car retaining position, effective to hold the car engaging means so raised independently of the fluid pump means and the power lift means; and a linkage means wherein said blocks are rigid and of a length to extend between said pivotal connection to said beam and said car engaging means when said car engaging means is in an elevated car retaining position, connected to the blocks for simultaneously shifting both blocks between the operative and inoperative positions.

27. A jack assembly according to claim 26, further wherein the linkage means includes a power cylinder for actuating the linkage means.

* * * * *